(12) United States Patent
Konate et al.

(10) Patent No.: US 9,494,257 B2
(45) Date of Patent: Nov. 15, 2016

(54) DEVICE OF THE TENSIONER TYPE FOR THE CONTROLLED CLAMPING AND MOVING OF AN ELONGATED ELEMENT

(71) Applicant: REEL, Saint-Cyr-Au-Mont-D'Or (FR)

(72) Inventors: Karamoko Konate, Saint-Regatien (FR); Marc Huillery, La Rochelle (FR)

(73) Assignee: REEL, Saint-Cyr-Au-Mont-D'or (FR)

( * ) Notice: Subject to any disclaimer, the term of this patent is extended or adjusted under 35 U.S.C. 154(b) by 0 days.

(21) Appl. No.: 14/701,543

(22) Filed: May 1, 2015

(65) Prior Publication Data

US 2015/0316175 A1    Nov. 5, 2015

(30) Foreign Application Priority Data

May 2, 2014    (FR) ..................................... 14 54013

(51) Int. Cl.
*F16L 1/23*     (2006.01)
*H02G 1/06*     (2006.01)

(52) U.S. Cl.
CPC .. *F16L 1/23* (2013.01); *H02G 1/06* (2013.01)

(58) Field of Classification Search
CPC .................................... F16L 1/23; H02G 1/06
See application file for complete search history.

(56) References Cited

U.S. PATENT DOCUMENTS

| | | | | |
|---|---|---|---|---|
| 3,473,715 A * | 10/1969 | Shuey, Jr. | .................. | F16L 1/23 226/108 |
| 6,439,445 B1 * | 8/2002 | De Groot | .................. | F16L 1/23 226/172 |
| 7,178,708 B2 * | 2/2007 | Grinsted | ................ | B65H 51/14 226/172 |
| 7,189,028 B1 * | 3/2007 | Signaroldi | .............. | B63B 35/03 405/166 |
| 7,226,244 B1 * | 6/2007 | De Groot | .................. | F16L 1/19 405/166 |
| 8,104,995 B2 * | 1/2012 | Roodenburg | ............. | F16L 1/23 226/172 |
| 8,425,155 B2 * | 4/2013 | Mikx | .................. | E02B 17/0872 405/196 |
| 8,496,409 B2 * | 7/2013 | Aksel | .................... | E21B 19/002 166/355 |
| 8,794,874 B2 * | 8/2014 | Roodenburg | ........ | B65H 51/105 405/158 |
| 9,316,332 B2 * | 4/2016 | Green | ..................... | B63B 35/03 |
| 2007/0140797 A1 * | 6/2007 | Armstrong | ............. | E21B 17/01 405/224.2 |
| 2011/0182671 A1 | 7/2011 | Roodenburg et al. | | |
| 2011/0188941 A1 | 8/2011 | Tame | | |
| 2014/0010595 A1 | 1/2014 | Maloberti et al. | | |

FOREIGN PATENT DOCUMENTS

FR         2 970 056 A1      7/2012

OTHER PUBLICATIONS

French Search Report, dated Jan. 14, 2015, from corresponding French application.

* cited by examiner

*Primary Examiner* — Benjamin Fiorello
(74) *Attorney, Agent, or Firm* — Young & Thompson

(57) ABSTRACT

Disclosed is a laying device (1) of the tensioner type for the controlled clamping and moving of an elongated body, intended to be carried by a laying tower. The laying device (1) includes an annular frame (10) including two mobile frame parts (101) that each include at least one guiding box (11) and that are assembled to an element (13) for the fastening of the laying device (1) to the tower (2), through a main pivot element (14). The main pivot element (14) defines a single main rotation axis (14'), around which the mobile frame parts (101) are rotationally operable between the closed/open configurations.

20 Claims, 4 Drawing Sheets

DEVICE OF THE TENSIONER TYPE FOR THE CONTROLLED CLAMPING AND MOVING OF AN ELONGATED ELEMENT

TECHNICAL FIELD TO WHICH RELATES THE INVENTION

The present invention relates to a device of the tensioner type for the controlled clamping and moving of an elongated member, this tensioner device being intended to equip in particular an installation for laying cables or pipelines along a water area.

TECHNOLOGICAL BACKGROUND

Certain installations are designed to allow the laying of elongated bodies, in particular cables or pipelines, along water areas.

Such installations are mainly met on floating structures, such as ships or off-shore platforms, for a laying along sea floors.

Such laying installations generally comprise a tower on which is added at least one laying device of the tensioner type.

The so-called "tensioners" laying devices ensure a handling by clamping of a segment of the elongated body, and the piloted moving of the latter, to allow the controlled laying thereof on the chosen receiving surface.

More precisely, a first role of the tensioner is to constantly clamp the cable or the pipeline in an efficient manner, taking into account the fact that the weight of the part of the elongated body that is transferred out of the floating structure increases significantly as the laying operation goes along.

The second role of the tensioner is to manoeuvre the elongated body to ensure the longitudinal displacement thereof, in a controlled manner. The speed of laying depends in particular on the time required for assembling cable or pipeline portions.

For that purpose, the tensioners conventionally comprise an annular frame that defines a passage for the circulation of the elongated body and that carries guiding boxes arranged about a passage axis of said passage of circulation for the clamping of a segment of the elongated body.

However, the elongated body is liable to carry pieces of equipment, such as connectors or bottom pieces of equipment, which have a cross section whose diameter is higher than the mean cross section of the elongated body, but also than the diameter of the passage of circulation.

To take this constraint into account, certain tensioners are "openable", as described for example in the patent FR-2 970 056.

The corresponding tensioner comprises a frame composed of two half-frames that are assembled, through pivot means, to a sleeve for the fixation of the tensioner to the tower.

These pivot means are arranged so as to allow a rotational operation of the half-frames between closed/open configurations, each one about a proper rotation axis.

But such an "openable" tensioner is liable to undergo significant constraints and efforts on its half-frames in the open position, liable to complicate the closing thereof.

OBJET OF THE INVENTION

The invention relates to a laying device of the tensioner type for the controlled clamping and moving of an elongated body, in particular a cable or a pipeline, said laying device being intended to be carried by a laying tower.

The laying device comprises an annular frame that defines a passage for the circulation of said elongated body, along a passage axis.

The annular frame comprises two mobile frame parts that each comprise at least one guiding box arranged about said passage axis.

The mobile frame parts are assembled to means for fastening said laying device to the tower, through main pivot means that allow a rotational operation of said mobile frame parts, relative to each other, between a closed laying configuration and an open configuration for access to said passage of circulation.

And according to the invention, the pivot means define a single main rotation axis, about which said mobile frame parts are rotationally operable between said closed/open configurations.

Such a structure has in particular for interest to offer a significant opening, without constraint or effort on its mobile parts, liable to complicate the closing thereof.

According to other advantageous embodiment characteristics, liable to be considered in combination or independently from each other:
- the two mobile frame parts are assembled to each other, and to the fastening means, through main pivot means;
- the annular frame comprises an inner annular surface and an outer annular surface, and the main rotation axis extends within the space defined by said inner and outer surfaces;
- the means for fastening to the tower consist in at least one plate that is fastened to the laying tower by bolting;
- the mobile frame parts each comprise at least two modules that each carry one at least of the guiding boxes, which modules of each mobile frame part are assembled to each other by couple through secondary pivot means that constitute a secondary rotation axis about which one of said frame modules is operable in rotation with respect to the other of said frame modules;
- as the case may be, preferably, the main and secondary pivot means of the frame are arranged so that the main rotation axis and the secondary rotation axes extend parallel to each other and parallel to the passage axis;
- as the case may be, the main pivot means, and as the case may be, the secondary ones, are associated with means for their locking in rotation; preferably, these rotation locking means consist in at least one locking cylinder operable to an active position within opposite orifices carried by the frame.

The present invention also relates to a system for laying an elongated body in a water area, which system comprises a floating structure equipped with a laying tower carrying at least one laying device according to the invention.

In this case, the laying tower advantageously comprises two lateral struts between which is arranged a central strut; and the fastening means equipping the laying device are fastened to said central strut of the laying tower.

Still in this case, the laying system advantageously includes means for supporting mobile frame parts of the laying device during their operations between the closed/open configurations.

These support means advantageously comprise:
- two lateral arms equipping the laying tower, preferably the lateral struts thereof, and each carrying a sliding path, and two sliding members each equipping one of the mobile frame parts and cooperating with one of said sliding paths.

Still in this case, the laying tower advantageously includes a handling device comprising a top sheave carried by an operating arm, so as to allow a disengagement of a load supported by said top sheave with respect to the passage axis.

DETAILED DESCRIPTION OF AN EXEMPLARY EMBODIMENT

The present invention will be further illustrated, without being limited in anyway, by the following description of a particular embodiment in relation with the appended figures, in which.

Figure 2:
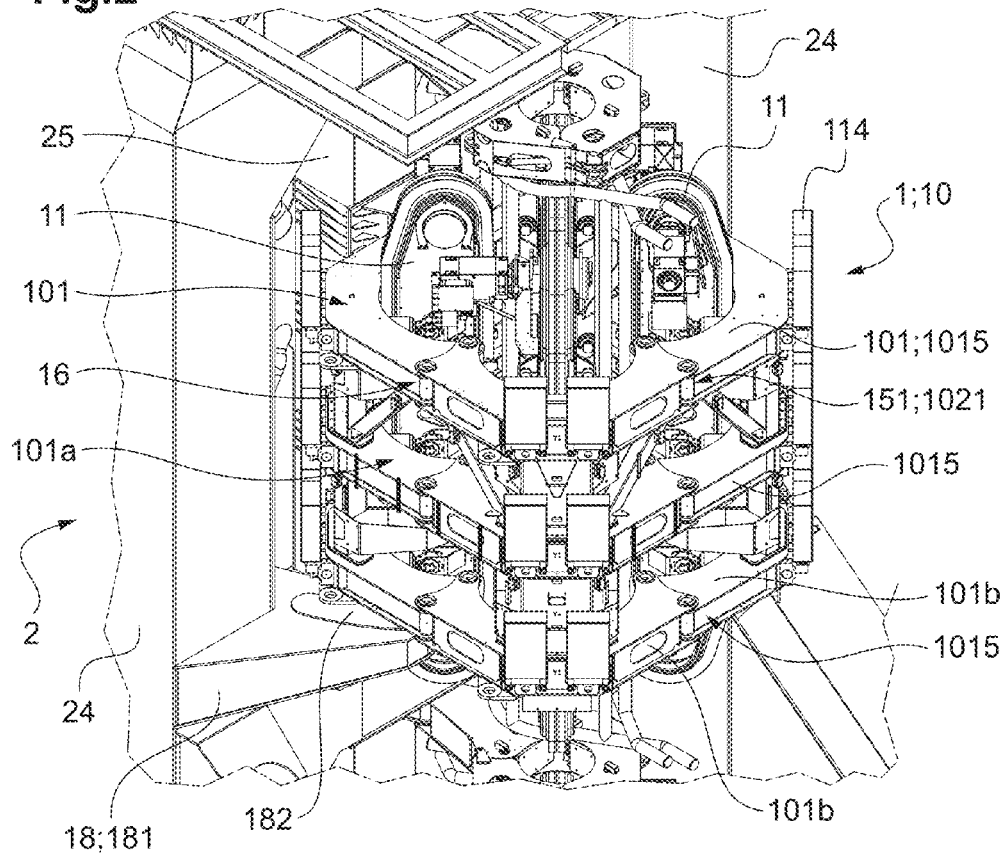
FIG. 2 is a partial and enlarged perspective view of one of the laying devices shown in FIG. 1, in the closed configuration.
Figure 7:
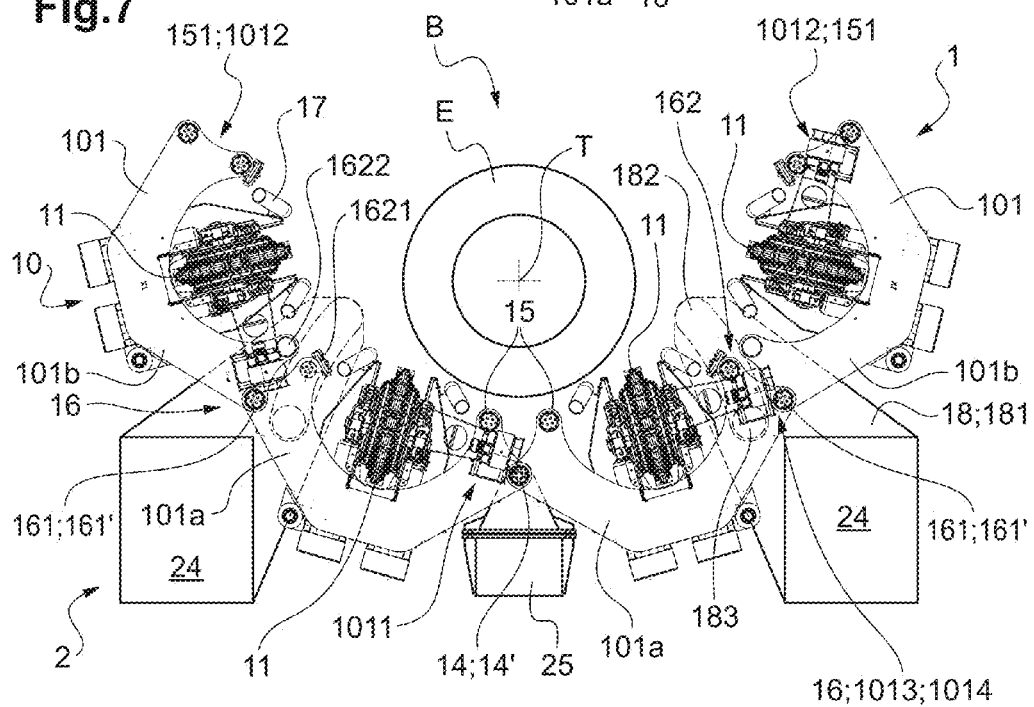

FIG. 7 also shows the laying device according to FIG. 2, in which the distal module of each of the two frame parts in the open configuration is pivotally operated with respect to the associated proximal module, about their respective secondary rotation axes.

The laying device 1 according to the invention, also called "tensioner device" or simply "tensioner", is intended to equip a system (or an installation) for the laying of an elongated body C in a water area (in particular on the sea floors).

The elongated body C advantageously consists in a cable, a flexible duct, for example a pipeline or an umbilical, or also an unrolled rigid duct.

Figure 1:
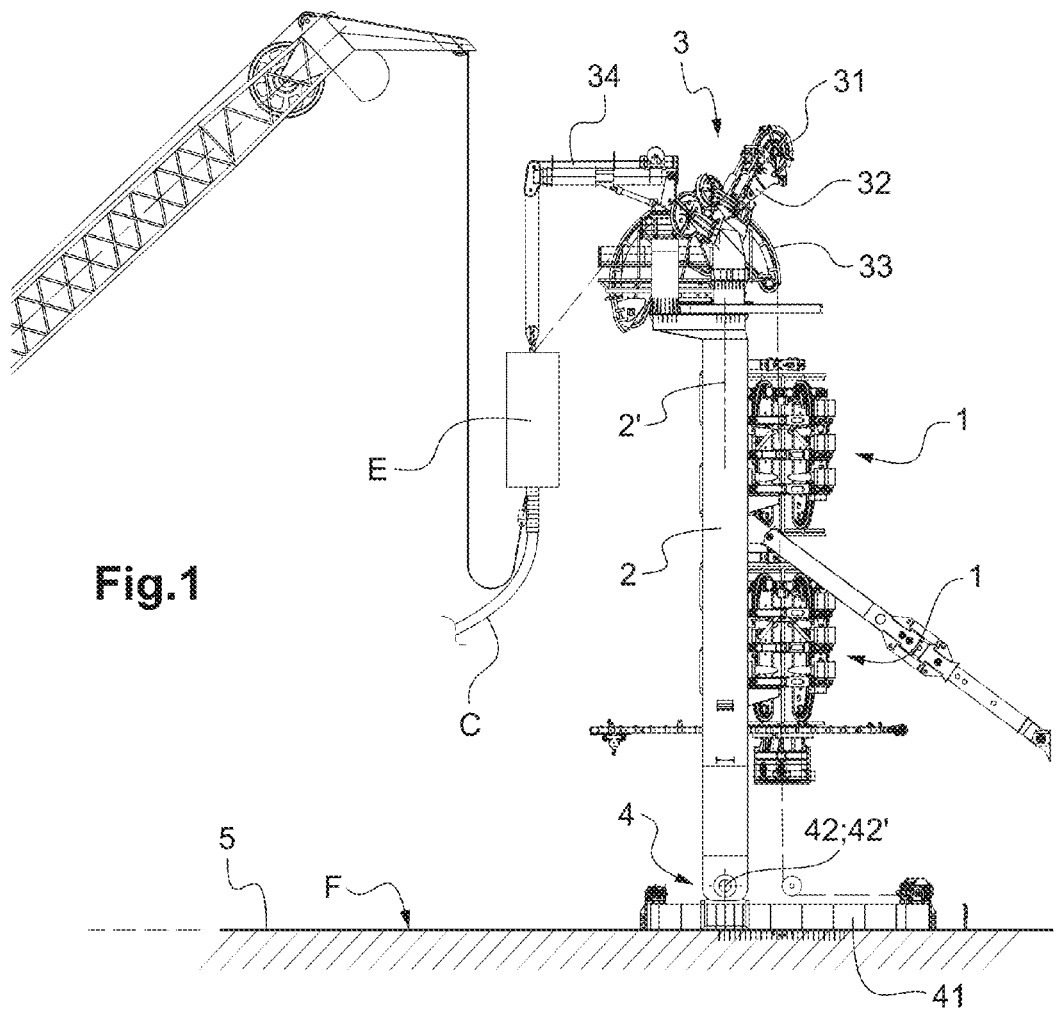
FIG. 1 is a side view of a tower that is intended to equip a floating structure and that carries two laying devices of the tensioner type.

As shown in FIG. 1, the system for laying the elongated body C comprises a floating structure F carrying a laying tower 2 that itself carries one or several tensioner devices 1 according to the invention.

The floating structure consists for example in a ship or an off-shore platform.

This floating structure is adapted to float on a water area, for example a sea, an ocean or a lake.

The laying tower 2, defining a longitudinal axis 2' and shown in FIG. 1, carries:
  two laying devices 1 according to the invention, coaxially superimposed to each other,
  handling means 3, arranged on the side of its upper end (remote from the floating structure F), and
  means 4 for fastening this tower 2 to a bridge 5 of the floating structure F, arranged on the side of its lower end.

Figure 3:
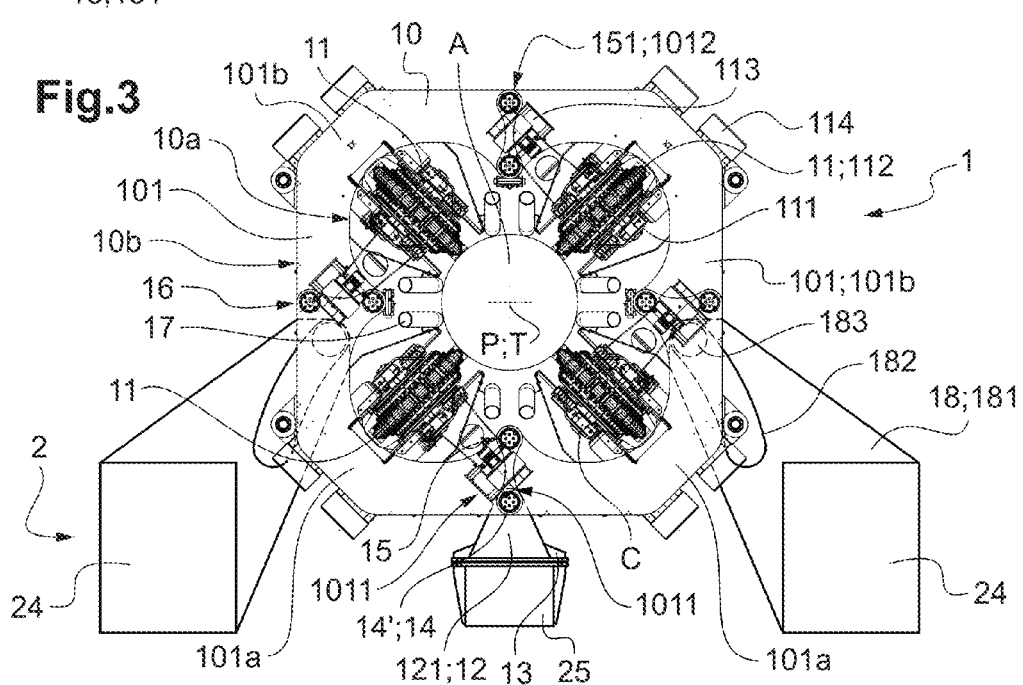
FIG. 3 is a top view of one of the laying devices shown in FIG. 1, in the closed configuration, with the tower schematically illustrated.

Herein, this laying tower 2 comprises two lateral struts 24, remote from each other, between which is arranged a central strut 25 (FIGS. 2 and 3).

The different struts 24, 25 extend parallel to each other and remote from each other.

As an alternative, the central strut 25 could be replaced by horizontal crossbars that extend between the two lateral struts 24 and that receive the laying devices 1.

The handling means 3, carried by the laying tower 2, include:
  a top sheave 31 cantilevered at the end of an operating arm 32, defining a vertical laying axis T,
  a substantially U-shaped trough 33, whose convexity is turned upward, defining a suitable radius of curvature for the elongated body C, and
  an operating crane 34, whose function is in particular to operate a piece of equipment E carried by the elongated body C above the trough 33.

The fastening means 4 comprise a base 41 intended to be fastened to the bridge 5 of the floating structure F.

Between this base 41 and the laying tower 2, the fastening means 4 herein comprise pivot connection means 42 that allow a rotation of the laying tower 2 about a horizontal axis 42' perpendicular to its longitudinal axis 2'.

One of the tensioner devices 1 is illustrated in more details in FIGS. 2 to 7.

Each tensioner device 1 is adapted to ensure, in a manner conventional per se, handling by clamping of a segment of the elongated body C, and the piloted moving of the latter, to allow the controlled laying thereof on a receiving surface consisted for example by a sea floor.

For that purpose, the tensioner device 1 comprises an annular frame 10 carrying guiding boxes 11 for the clamping of a segment of the elongated body C during the laying thereof.

The annular frame 10, consisting in a mechanically welded structure, includes:
  an inner annular surface 10a, defining a passage A for the circulation of the elongated body C, along a passage axis P (also called "firing axis" or "firing line"), and
  an outer annular surface 10b.

According to the laying method implemented, the tensioner device 1 is positioned so that its passage axis P is oriented (i) vertically or substantially vertically as illustrated in FIG. 1, or (ii) horizontally or substantially horizontally.

The guiding boxes 11, herein four in number, are distributed about the passage axis P.

As a function of the design of the tensioner device 1, the guiding boxes 11 may also be for example two, three, five or six in number, regularly distributed about the passage axis P.

In a manner conventional per se, each guiding box 11 comprises a support body 111 on which a peripheral guiding chain 112 driven by a motor 113 is guided in translation.

A front strand of the peripheral guiding chain 112 extends parallel to the passage axis P, to constitute the surface of contact with a segment of the elongated body C to be deposited.

The support body 111 of each guiding box 11 may be associated with the frame 10 through operating means 114 that ensure a piloting in translation of this box 11 parallel to itself, and along a direction perpendicular to the passage axis P.

The operating means 114 consist for example in linear actuators, for example of the electric cylinder or hydraulic cylinder type.

In practice, as illustrated in FIG. 1, the elongated body C may be caused to carry added pieces of equipment E, such as connectors or bottom pieces of equipment.

Such pieces of equipment E have conventionally a cross section whose diameter is higher than that of the mean cross section of the elongated body C (and hence of the passage A).

Within this framework, and according to the invention, the frame 10 is composed of two mobile frame parts 101 on which are distributed the guiding boxes 11.

The two mobile frame parts 101 are herein identical, or at least approximately identical, to each other.

They form a kind of jaw, each generally C-shaped, which each carry two guiding boxes 11.

Each mobile frame part 101 is delimited by two ends:
a proximal end 1011, located on the side of the laying tower 2, and
a distal end 1012, located remote from the laying tower 2.

Figure 5:
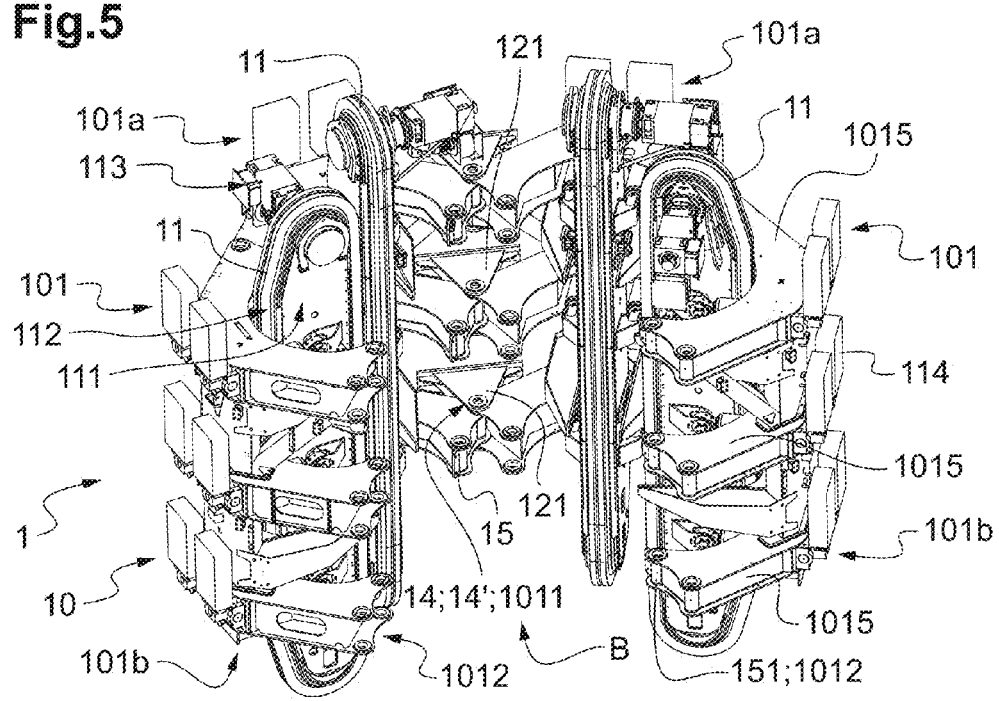
FIGS. 5 and 6 illustrate the laying device according to FIG. 4, according to a perspective on the distal side (opening side) and according to a perspective on the proximal side (main rotation axis side), respectively.
Figure 6:
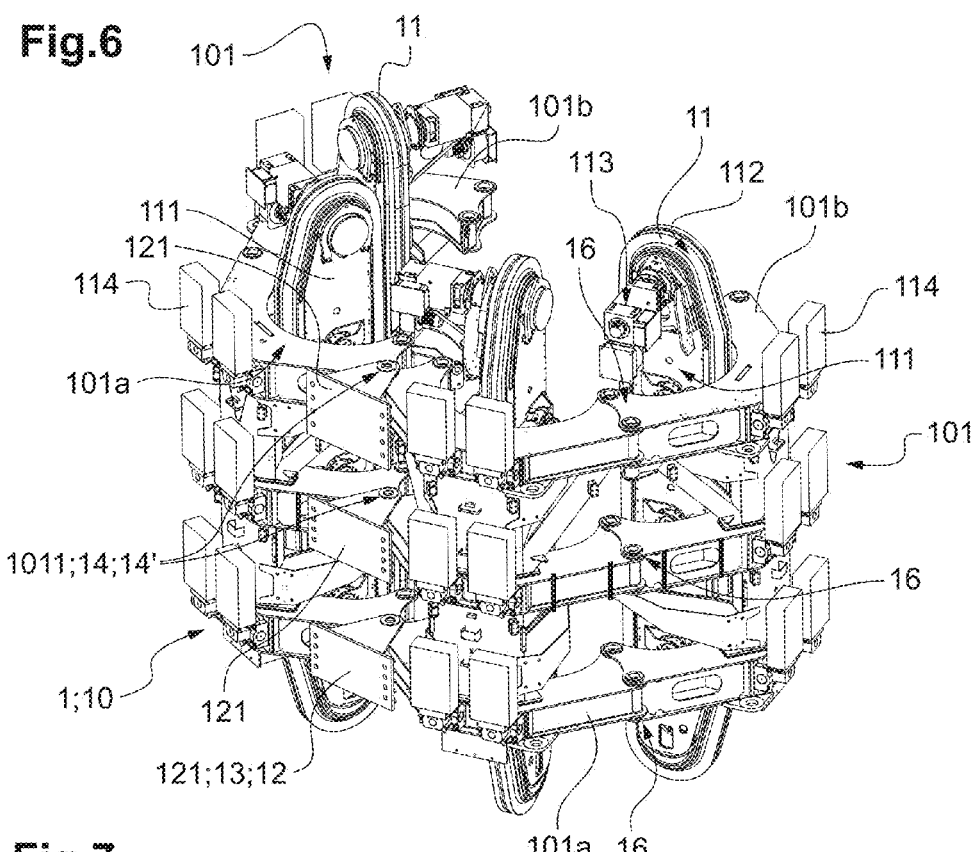

Each mobile frame part 101 is herein consisted of several frame stages 1015, herein three in number, superimposed to each other and remote from each other (visible in FIGS. 2, 5 and 6).

These frame stages 1015 are advantageously fastened together via spacer structures.

These two mobile frame parts 101 are assembled to each other, at their adjacent proximal ends 1011, through main connection means 12.

The main connection means 12 are adapted, on the one hand, to the fastening of the tensioner device 1 to the laying tower 2 and, on the other hand, to allow a rotational operation of the mobile frame parts 101, relative to each other, according to a single rotation axis parallel to the passage axis P.

Herein, the mobile frame parts 101 are mobile between two configurations:
a closed configuration (FIGS. 2 and 3) in which the distal ends 1012 of the mobile frame parts 101 are adjacent and fastened to each other, the guiding boxes 11 being then adapted to clamp a segment of the elongated body C during the laying thereof, and
an open configuration (FIGS. 3 to 7) in which the distal ends 1012 of the mobile frame parts 101 are spaced apart from each other, to define a lateral access B to the passage of circulation A.

For that purpose, the main connection means 12 comprise at least one fork-shaped structure 121, of which:
a first end is provided with means 13 for the fastening of the tensioner device 1 to the laying tower 2, and
a second end is provided with main pivot means 14 that allow a rotational operation of the two mobile frame parts 101, relative to each other, between the closed/open configurations.

In this case, the main connection means 12 comprise several fork-shaped structures 121, herein three in number, superimposed to each other and remote from each other (FIGS. 5 and 6).

Each fork-shaped structure 121 is herein directly associated with a pair of stages 1015 of the mobile frame parts 101.

The fastening means 13 consist for example in a plate that is intended to be fastened by bolting to one of the faces of the laying tower 2, in particular the central strut 25 thereof.

The proximal ends 1011 of the two mobile frame parts 101 are assembled to each other, and to the fastening means 13, through main pivot means 14.

The main pivot means 14 consist for example in a journal cooperating with the proximal ends 1011 of the two mobile frame parts 101.

These main pivot means 14 constitute a main rotation axis 14' extending parallel to the passage axis P.

The main rotation axis 14' hence extends within the space defined by the inner 10a and outer 10b surfaces of the annular frame 10, on the side of the outer annular surface 10b.

The main connection means 12 still comprise means 15 for the locking in rotation of the frame parts 101 about the main rotation axis 14'.

The locking means 15 consist, for example, in at least one locking cylinder associated with a spindle operable to an active position within complementary orifices coming in correspondence to each other.

The locking means 15 are herein arranged within the space defined by the inner 10a and outer 10b surfaces of the annular frame 10, on the side of the inner annular surface 10a.

To participate to this locking in rotation, the distal ends 1012 of the mobile frame parts 101 include complementary locking means 151.

The complementary locking means 151 consist for example in at least one locking cylinder associated with a spindle operable to an active position within complementary orifices coming in correspondence to each other.

As illustrated in FIG. 7, each frame part 101 is itself composed of several modules 101a, 101b that each carry one of the guiding boxes 11.

In this case, each frame part 101 comprises two identical, or at least approximately identical, modules, i.e.:
a proximal module 101a, whose first end (corresponding to the proximal end 1011) is assembled to the laying tower 2 through main connection means 12, and
a distal module 101b, assembled to the proximal module 101a, through secondary connection means 16.

Herein, a first lateral end 1013 of the distal module 101b is assembled to a second lateral end 1014 of the proximal module 101a through secondary connection means 16. And a second lateral end of this distal module 101b forms the distal lateral end 1012 of the mobile frame part 101.

The secondary connection means 16 comprise:
secondary pivot means 161, arranged on the side of the outer annular surface 10b, constituting a secondary rotation axis 161', and
means 162 for the locking in rotation of said secondary pivot means 161 in the closed configuration.

These secondary connection means 16 are herein redundant on each of the stages 1015 of the mobile parts 101.

The adjacent ends of the couple (or the pair) of modules 101a, 101b are assembled to each other through secondary pivot means 161.

The secondary pivot means 161 consist for example in a journal cooperating with the adjacent ends of the couple of modules 101a, 101b.

These secondary pivot means 161 allow a rotational operation of the distal module 101b with respect to the proximal module 101a.

The secondary pivot means 161 are arranged so that their respective secondary rotation axes 161' and that the main rotation axis 14' extend parallel to each other (herein vertically or at least approximately vertically).

The means 162 for locking in rotation the secondary connection means 16 themselves consist, for example, in at least one locking cylinder 1621 associated with a wedging member operable to an active position within complementary orifices 1622 arranged in correspondence to each other (FIG. 7).

Each module 101a, 101b of the frame 10 is also equipped with two bumping members 17 ("bumpers") which are carried by the associated guiding box 11 and that are arranged on either side of the chain 112 thereof.

For their part, the lateral struts 24 comprise means 18 for supporting the frame parts 101 of the tensioner device 1 during the operation thereof between the closed (FIGS. 2 and 3) and open (FIGS. 4 to 7) configurations.

These support means 18 comprise:
- two lateral arms 181 each extending from one of the lateral struts 24, on which is arranged a sliding path 182 consisting for example in a stainless steel surface, and
- two sliding members 183, for example each in the form of a bronze-made pad, which each equip the lower face of one of the frame parts 101 (in particular the lower face of the proximal module 101a) and that are each adapted to move along one of the sliding paths 182.

In particular, the two lateral arms 181 each consist in cantilevered arms, underlying the lower surface or each of the frame parts 101 (in particular the lower face of the proximal module 101a).

Generally, the frame 10 is associated with a set of operating means (not shown) for the displacement of frame parts 101 and/or modules 101a, 101b about their respective rotation axes 14', 161'.

These operating means (not shown) consist for example in actuators, for example electric cylinders or hydraulic cylinders.

In operation, in the closed configuration (FIGS. 2 and 3), the two frame parts 101 form an annular frame 10 defining the passage A for the elongated body C.

In this configuration, the top sheave 31 (carried by the operating arms 32) is arranged so that the vertical laying axis T extends coaxially to the passage axis P.

The guiding boxes 11 are arranged about the passage axis P for the clamping of a segment of the elongated body C extending in the passage A, and to ensure the controlled moving thereof.

The two guiding parts 101 are held in this closed configuration by the activation of the different locking means, i.e.:
- the locking means 15 equipping the main connection means 12,
- the locking means 162 equipping the secondary connection means 16, and
- the complementary locking means 151 arranged at the distal ends 1012 of the frame parts 101.

If need be, for example for the passage of objects E of large section along the passage axis P (for example a connector), the tensioner device 1 may be operated to its open configuration (FIGS. 4 to 7).

To obtain this configuration, the two frame parts 101 are spaced apart from each other by a rotational operation about the main rotation axis 14' defined by the main pivot means 14.

Figure 4:
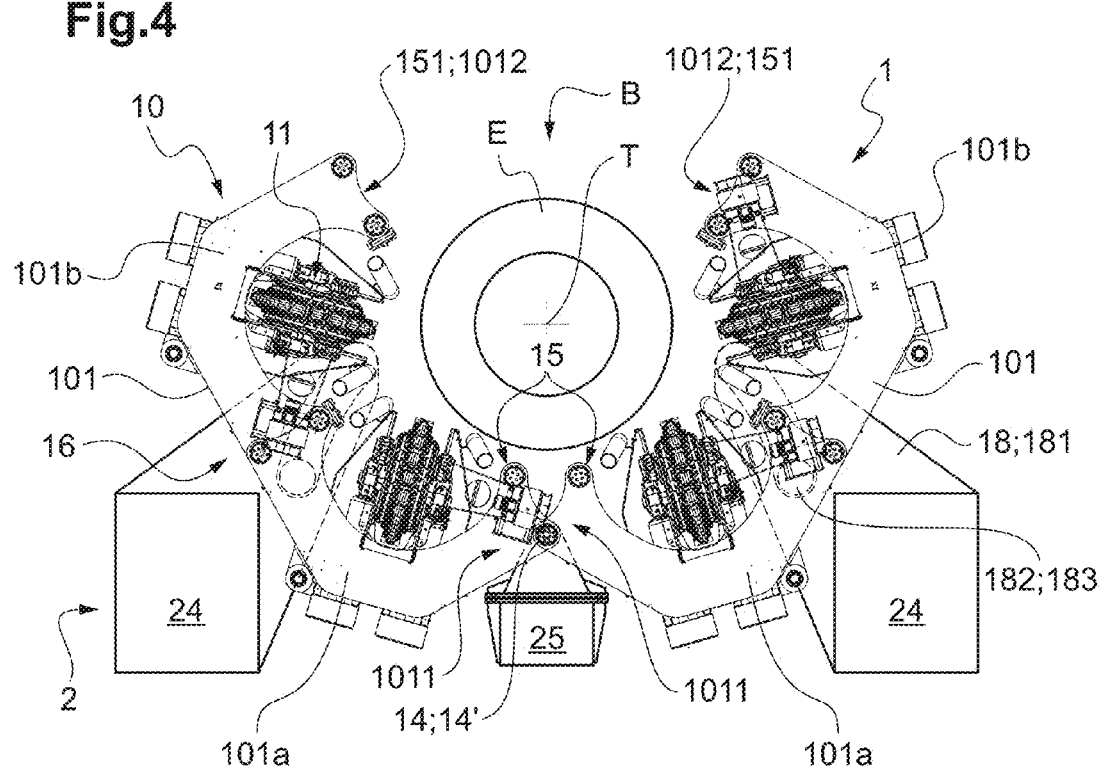
FIG. 4 shows the laying device according to FIG. 2, in which the two mobile frame parts are pivoted about the main rotation axis up to the open configuration.

For that purpose, each mobile frame part 101 is operated in one direction of rotation that is opposite to the direction of rotation of the other mobile frame part 101 (in FIG. 4, in a counter-clockwise direction for the mobile frame part 101 located on the left and in a clockwise direction for the frame part 101 located on the right).

The distal ends 1012 of the mobile frame part 101 are hence spaced apart from each other, delimiting the longitudinal access B.

To allow this operation to the open configuration, some of the means for locking the frame 10 are previously deactivated, i.e.:
- the locking means 15 equipping the main connecting means 12, and
- the complementary locking means 151 arranged at the distal ends 1012 of the mobile frame parts 101.

The locking means 162 of the secondary connection means 16 are advantageously held in the activated position.

The operation to the open configuration is assisted by the support means 18 associated with the lateral struts 24.

In particular, each sliding member 183 moves along its associated sliding path 182, following a circular trajectory centred on the main rotation axis 14'.

In the case where a lateral access B of increased width is desired, it is herein possible to pivotally operate the distal modules 101b with respect to their associated proximal modules 101a, so to further space them apart from each other.

The operation is performed by a rotational movement of each distal module 101b about the secondary rotation axis 161' defined by the secondary pivot means 161.

The displacement is made possible by the previous inactivation of the locking means 162 equipping the respective secondary connection means 16.

To facilitate this passage of the object E, the operating arm 32 may also be piloted so as to be pivoted and elongated, so as to space apart the top sheave 31 (and the laying axis T thereof) with respect to the laying tower 2 and the passage axis P (FIGS. 4 and 7).

Once the passage performed, the means for operating the frame 10 may be piloted so as to come back to the closed configuration, then the locking means 15, 162, 151 are re-activated.

Generally, each mobile frame part 101 may include more than two modules (for example three), arranged in series one after each other. Each of these modules includes at least one guiding box.

These modules are assembled two by two (by couple) at their adjacent ends, through secondary connection means 16 (in particular secondary pivot means 161).

The modules of each couple are adapted to pivot relative to each other about a secondary rotation axis 161'.

The invention claimed is:

1. A tensioner-type laying device for controlled clamping and moving of an elongated body, said laying device being configured to be carried by a laying tower, the laying device comprising:
an annular frame that defines a passage for circulation of said elongated body, following a passage axis, the annular frame comprising
two mobile frame parts that each comprise at least one guiding box arranged about said passage axis, the two mobile frame parts being assembled to a fastening system configured to fasten the said laying device to said tower, through a main pivot device that allows a rotational operation of said mobile frame parts, relative to each other, between a closed laying configuration and an open configuration for access to said passage of circulation, said main pivot device defining a single main rotation axis about which said mobile frame parts are rotationally operable between said closed configuration and the open configuration.

2. The tensioner-type laying device according to claim 1, wherein the two mobile frame parts are assembled to each other, and to the fastening system, through the main pivot device.

3. The tensioner-type laying device according to claim 2, wherein the annular frame comprises an inner annular surface and an outer annular surface, the main rotation axis extending within the space defined by the inner and outer annular surfaces.

4. The tensioner-type laying device according to claim 2, wherein the mobile frame parts each comprise at least two modules that each carry at least one of the guiding boxes, the modules of each mobile frame part being assembled to each other by a couple through secondary pivot device that constitutes a secondary rotation axis about which one of said modules is rotationally operable with respect to the other of said modules.

5. The tensioner-type laying device according to claim 2, wherein one or more of the main pivot device of the frame and the secondary pivot device are associated with a locking system configured to lock the main pivot device and the secondary device in rotation.

6. The tensioner-type laying device according to claim 1, wherein the annular frame comprises an inner annular surface and an outer annular surface, the main rotation axis extending within the space defined by the inner and outer annular surfaces.

7. The tensioner-type laying device according to claim 6, wherein the mobile frame parts each comprise at least two modules that each carry at least one of the guiding boxes, the modules of each mobile frame part being assembled to each other by a couple through secondary pivot device that constitutes a secondary rotation axis about which one of said modules is rotationally operable with respect to the other of said modules.

8. The tensioner-type laying device according to claim 6, wherein one or more of the main pivot device of the frame and the secondary pivot device are associated with a locking system configured to lock the main pivot device and the secondary device in rotation.

9. The tensioner-type laying device according to claim 1, wherein the mobile frame parts each comprise at least two modules that each carry at least one of the guiding boxes, the modules of each mobile frame part being assembled to each other by a couple through secondary pivot device that constitutes a secondary rotation axis about which one of said modules is rotationally operable with respect to the other of said modules.

10. The tensioner-type laying device according to claim 9, wherein the main pivot devices and the secondary pivot device of the frame are disposed so that the main rotation axis and the secondary rotation axes extend parallel to each other.

11. The tensioner-type laying device according to claim 10, wherein one or more of the main pivot device of the frame and the secondary pivot device are associated with a locking system configured to lock the main pivot device and the secondary device in rotation.

12. The tensioner-type laying device according to claim 9, wherein one or more of the main pivot device of the frame and the secondary pivot device are associated with a locking system configured to lock the main pivot device and the secondary device in rotation.

13. The tensioner-type laying device according to claim 9, wherein one or more of the main pivot device of the frame and the secondary pivot device are associated with a locking system configured to lock the main pivot device and the secondary device in rotation.

14. A system for laying an elongated body in a water area, the laying system comprising:
    a floating laying structure equipped with the laying tower carrying at least one of the laying device according to claim 1.

15. The laying system according to claim 14, wherein the laying tower includes a handling device comprising a top sheave carried by an operating arm, to allow a disengagement of a laying axis with respect to the passage axis.

16. The laying system according to claim 14, wherein the laying tower comprises two lateral struts between which is arranged a central strut, and
    wherein the fastening system equipping the laying device is fastened to said central strut of the laying tower.

17. The laying system according to claim 14, further comprising a support system configured to support the mobile frame parts of the laying device during operations between the closed configuration and the open configuration configurations.

18. The laying system according to claim 17, wherein the support system comprises:
    two lateral arms equipping the laying tower, preferably the lateral struts thereof, each of the lateral arms carrying a sliding path, and
    two sliding members each equipping one of the mobile frame parts and each cooperating with one of said sliding paths.

19. A system for laying an elongated body in a water area, the laying system comprising:
    a floating laying structure equipped with the laying tower carrying at least one of the laying device according to claim 2.

20. A system for laying an elongated body in a water area, the laying system comprising:
    a floating laying structure equipped with a laying tower carrying at least one of the laying device according to claim 6.

* * * * *